(12) United States Patent
Kuo et al.

(10) Patent No.: US 6,734,127 B2
(45) Date of Patent: May 11, 2004

(54) CERAMIC MATERIALS FOR CAPACITORS WITH A HIGH DIELECTRIC CONSTANT AND A LOW CAPACITANCE CHANGE WITH TEMPERATURE

(76) Inventors: Dong-Hau Kuo, No. 1, Sec. 2, University Road, Shou-Feng Hsiang, Hualien (TW); Chih-Hung Wang, 4F, No. 7, Alley 4, Lane 217, Sec. 3, Chung-Hsiao East Road, Taipei (TW)

( * ) Notice: Subject to any disclaimer, the term of this patent is extended or adjusted under 35 U.S.C. 154(b) by 275 days.

(21) Appl. No.: 09/973,524

(22) Filed: Oct. 9, 2001

(65) Prior Publication Data

US 2003/0100438 A1 May 29, 2003

(51) Int. Cl.$^7$ .................. C04B 35/468; C04B 35/472
(52) U.S. Cl. .................. 501/138; 501/139
(58) Field of Search .................. 501/138, 139

(56) References Cited

U.S. PATENT DOCUMENTS

| | | | |
|---|---|---|---|
| 4,987,107 A | | 1/1991 | Narumi et al. ............ 501/137 |
| 5,155,072 A | * | 10/1992 | Bruno et al. ............ 501/138 |
| 5,296,425 A | * | 3/1994 | Chazono et al. ............ 501/138 |
| 6,074,970 A | * | 6/2000 | Yamashita et al. ............ 501/138 |
| 6,534,429 B1 | * | 3/2003 | Jackson ............ 501/138 |
| 6,544,916 B1 | * | 4/2003 | Sato et al. ............ 501/137 |
| 6,559,084 B1 | * | 5/2003 | Fujikawa et al. ............ 501/139 |

OTHER PUBLICATIONS

Moulson A.J, et al. "Electroceramics: Materials Properties Applications". Chapter: Dielectrics and Insulators . . . Chapman & Hall (1990) pp. 256–263.

Hennings, D.F.K. et al. "High–Permittivity Dielectric Ceramics with High Endurance". Journal of European Ceramic Society (1994) pp. 81–88.

Goodman, G. "Capacitors Based on Ceramic Grain Boundary Barrier Layers–A Review". Amer. Ceram. Soc., No. 1 (1981) pp. 215–231.

Morrison, F.D. et al. "Novel Doping Mechanism for Very–High–Permittivity Barium Titanate Ceramics". J. Am. Ceram. Soc, 81 [7] 1957–1960 (1998 PP 1957–1960).

Yan, M.F. et al. "Preparation and Properties of $PbO-MgO-Nb_2O_5$ Ceramics near the $Pb(Mg_{1/3}Nb_{2/3})O_3$" J. Mater. Res. vol. 4, No. 4 (1989) pp. 930–944.

* cited by examiner

*Primary Examiner*—Karl Group
(74) *Attorney, Agent, or Firm*—Ladas & Parry

(57) ABSTRACT

The present invention discloses low-cost ceramic powders prepared by the conventional ceramic processing with ceramic raw materials comprising carbonates, oxides and/or hydroxides of barium (Ba), titanium (Ti), magnesium (Mg) and optionally strontium (Sr), lanthanum (La) and niobium (Nb), and lead titanate ($PbTiO_3$) and/or lead oxide (PbO). The present invention also discloses a ceramic material obtained by the ceramic powder through densification and reduction-reoxidation, which has a dielectric constant of about 20,000 to about 55,000, a dielectric loss tangent (tan δ) of about 0.05 to about 0.25, a low capacitance change with temperature (low TCC) of about –15% to about 10% at a temperature range of –55° C. to 150° C., a resistivity of about $10^6$ Ω·cm to about $10^9$ Ω·cm, and a small grain size of about 0.5 to about 3.5 μm. The ceramic materials are useful in the production of capacitors or modules having high performance such as high dielectric constants and low TCC values with low cost. The ceramic powder also can mix with a glass component of low melting temperature to form a low temperature co-fired capacitor.

18 Claims, 2 Drawing Sheets

CERAMIC MATERIALS FOR CAPACITORS WITH A HIGH DIELECTRIC CONSTANT AND A LOW CAPACITANCE CHANGE WITH TEMPERATURE

FIELD OF THE INVENTION

The present invention relates to ceramic compositions, ceramic powders and ceramic materials for producing capacitors with a high dielectric constant (K), a low dielectric loss tangent (tan δ), a low capacitance change with temperature (temperature coefficient of capacitance, TCC), a good resistivity (ρ) and a small grain size. The ceramic compositions, ceramic powders and ceramic materials of the present invention are useful for the applications in ceramic chip capacitors, barrier layer capacitors including grain boundary barrier layer capacitors and reduction-reoxidation type semiconductive capacitors, multilayer ceramic capacitors (MLCCs), low temperature co-fired capacitors (LTCCs), polymer/ceramic capacitors, and modules integrated with resistors and/or inductors for telecommunications, military and automotive applications, and data processing.

BACKGROUND OF THE INVENTION

The discovery of $BaTiO_3$ opens the era of the electronic ceramics in 1930s. $BaTiO_3$, a perovskite structure, is now one of the major components most frequently used in the formation of ceramic dielectrics because of its high dielectric constant. Cubic perovskite $BaTiO_3$ is obtained at high temperature; tetragonal $BaTiO_3$ starts to form at a temperature of about 120° C.; orthorhombic $BaTiO_3$ is obtained at a temperature of about 0° C.; and rhombic $BaTiO_3$ is obtained at a temperature of about −80° C. The phase transition point for the cubic-to-tetragonal transition is specially called the Curie point (about 120° C.). Below Curie point, $BaTiO_3$ has ferroelectric characteristics. The dielectric constant of $BaTiO_3$ at the Curie point of 120° C. can reach a peak value as high as 10,000, but it decreases rapidly as the temperature deviates from Curie point. Chemical additives or so-called "shifters" have been applied to $BaTiO_3$ to move the Curie peak value to improve the capacitance and to smooth the Curie peak so as to obtain a lower TCC close to room temperature.

The perovskite structure of $BaTiO_3$ has two cation sites: tetrahedral and octahedral. The tetrahedral site or so-called A site is larger and is only suitable for large-sized ions such as $Ba^{2+}$, $Ca^{2+}$, $Sr^{2+}$, $La^{3+}$ etc. The octahedral site or so-called B site is smaller and suitable for small-sized ions such as $Ti^{4+}$, $Z^{4+}$.

Much effort has been taken to ceramic materials with high dielectric constants at room temperature. Two material systems have been the focuses. One is $BaTiO_3$ and the other is the lead magnesium niobate, $Pb(Mg_{1/3}Nb_{2/3})O_3$ or PMN. Some promising examples of $BaTiO_3$ system include the strontium (Sr)-doped and lanthanum (La)-doped $BaTiO_3$. These doped $BaTiO_3$ have the dielectric constants of 10,000 to 19,000, Morrison et al., *J. Am. Ceram. Soc.*, 81 [7] 1957–1960 (1998) at room temperature. PMN is also a perovskite structure and a ferroelectric material. Dielectric constant of PMN has a broad maximum at the Curie temperature of around 0° C. With 10% $PbTiO_3$ doping, the Curie point can be moved toward room temperature and the dielectric constant can reach 29,000, Yan et al., *J. Mater Res.*, 4 [4] 930–944 (1989).

Dielectrics with dielectric constant exceeding 1000 are based on ferroelectric materials and are more sensitive to temperature, field strength and frequency than lower-permittivity dielectrics. The Electronics of Industries Association (EIA) of the United States has devised a scheme for specifying the variability of capacitance with temperature in the range of practical interest. Class II capacitors possess high dielectric constants. Y5V, Y5U, and Z4V are examples. These capacitors with high dielectric constants also show a high TCC of greater than ±20%.

Barrier-layer capacitors i.e. Class III capacitors are another form of electroceramics with a high dielectric constant. Most materials containing $TiO_2$ become conductive on firing in reducing atmospheres. One of the barrier-layer capacitors, the reduction-reoxidation type, is formed by annealing the reduced $TiO_2$-containing electroceramic in air or oxygen, which results in a surface layer of high resistivity and a central portion of semiconductive material for a dielectric layer. Alternatively, each semiconductive grain may be surrounded by an insulating barrier layer. High dielectric constants of 50,000 to 100,000 were reported for $BaTiO_3$-based materials, G. Goodman, *Advances in Ceramics*, Amer. Ceram. Soc., 1, 215–231 (1981). For most barrier-layer capacitors, the effective permittivity is 10,000 to 20,000 for $SrTiO_3$ and up to 50,000 for $BaTiO_3$ electroceramics. Although the $SrTiO_3$-based ceramic materials are more stable with respect to temperature than those based on $BaTiO_3$, they have a TCC within ±20% over a −20 to +85° C. range, Moulson and Herbert, pp. 262 in Section 5.7.4 of *Electroceramics: Materials, Properties, Applications*, Chapman & Hall, 1990.

Multilayer ceramic capacitors (MLCCs) possessing high capacitance can be engineered into passive components that are readily attachable to the substrates used in the electronic industry. The major cost of MLCCs comes from the palladium (Pd) composition of the electrode. MLCCs with Ag—Pd electrodes are sintered in air. By replacing the precious metal electrodes with nickel or its alloy electrodes, i.e. base metal electrodes (BMEs), the cost of MLCCs can be greatly reduced. To protect Ni or Ni alloy from oxidation, the BME approach for MLCCs requires to be processed in a reducing atmosphere, an inert atmosphere, or a controlled oxygen pressure. MLCCs can keep their dielectric properties at low-oxygen densification only if they are processed in the presence of a sufficient concentration of acceptors. BME dielectrics with high dielectric constants usually display high TCC values. A considerable development is needed to explore for the BME dielectrics to resist reduction. $[(Ba_{0.85}Ca_{0.15})O]_{1.01}(Ti_{0.9}Zr_{0.1})O_2$ is a representative with its stability against firing under reducing conditions, page 258 in Section 5.7.4 of *Electroceramics: Materials, Properties, Applications*, Chapman & Hall, 1990.

Ceramic capacitors can be miniaturized by use of a dielectric ceramic material with a high dielectric constant (K) or by decreasing the thickness of dielectric ceramic layers. However, the grain size of multi-doped ceramic dielectrics fabricated by the conventional solid-state reaction is typically more than 5 μm. Thus, if the thickness of dielectric ceramic layers is decreased to 10 μm or below, the number of crystal grains present in each layer is considerably decreased, resulting in poor reliability of ceramic capacitors. The Curie maximum of the multi-doped $(Ba_{0.87}Ca_{0.13})(Ti_{0.88}Zr_{0.12})O_3$ dielectric is higher at the larger grain size, D. F. K. Hennings, B. Schreinemacher, and H. Schreinemacher, *J. the Europ. Soc.* 13, 81–88 (1994). The Curie peak is lowered to less than 4,000 and broadened at the grain size of 3 μm. To enhance the capacitance, the advanced dielectric green sheets for MLCCs need to have a thickness of less than 5 μm. With the thinner multiple-stacked layers of a high-K material, MLCCs with high capacitance can be obtained. As the ceramic sheet of MLCCs is less than 5 μm, the grain size of the high-K material is requested to be even smaller. However, microstructures of the current barrier layer capacitors are large-grained to maximize capacitance because the capacitance generally increases with the increase of grain size. It has been an inherent problem to have high-K capacitors with small grain size.

U.S. Pat. No. 4,987,107, issued on Jan. 22, 1991 to Narumi et al., discloses a ceramic composition for reduction-reoxidation type semiconductive capacitors, which comprises barium titanate or barium titanate and strontium titanate, and has a breakdown voltage of not less than 900 V, an insulation resistance of not less than $10^{10}$ Ω, an electrostatic capacity per unit surface area of not less than 0.06 μF/cm², and a low dielectric loss tangent, tan δ, of not more than 2.0%. This ceramic composition is not satisfactory on the grain size required for MLCCs having thickness of less than 5 μm in each ceramic sheet. Also, the dielectrics obtained from this ceramic composition have higher TCC values.

Therefore, there is still a need to develop a ceramic composition which permits production of a capacitor possessing a fine grain size particularly required by MLCC materials, and exhibiting a high dielectric constant, a low dielectric loss tangent, a low TCC, and a high resistivity. The present invention provides ceramic compositions fitting the aforementioned needs by incorporating lead into multi-doped $BaTiO_3$ ceramics.

SUMMARY OF THE INVENTION

Accordingly, one object of the present invention is to provide a ceramic composition that has the following general formula (I):

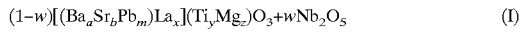

wherein a is 0.5 to 0.98, b is 0 to 0.3, m is more than zero to 0.3, x is 0 to 0.05, y is 0.90 to 0.995, z is 0.005 to 0.1, and w is 0 to 0.05 in weight ratio. The ceramic composition can provide a ceramic material with a dielectric constant of about 20,000 to about 55,000, a low dielectric loss tangent (tan δ) of about 0.05 to about 0.25, a TCC value of about −15% to about 10% at a temperature of −55° C. to 150° C., a resistivity of about $10^6$ Ω·cm to about $10^9$ Ω·cm, and with a grain size of about 0.5 to about 3.5 μm, useful in the production of capacitors and modules. The ceramic material of the present invention with excellent dielectric properties can be obtained at low cost with cheap raw materials.

The second object of the present invention is to provide a ceramic powder with the chemical composition of formula (I), preparing from carbonates, oxides and/or hydroxides of barium (Ba), titanium (Ti), magnesium (Mg) and optionally strontium (Sr), lanthanum (La) and niobium (Nb), and lead titanate ($PbTiO_3$) and/or lead oxide (PbO), wherein the atomic ratio of lead, based on the total amount of Ba, Ti, La, Mg, Sr, Pb and Nb is more than zero to 0.158.

Still, a further object of the present invention is to form a glass/$BaTiO_3$ composite with aids of the ceramic powder of formula (I) and a glass component selected from the group consisting of a low-firing-temperature glass, lead glass or a combination thereof via reduction-reoxidation procedures, useful for producing low temperature co-fired capacitors with dielectric constants of about 360 to about 2,500.

DETAILED DESCRIPTION OF THE INVENTION

Figure 1:
FIGS. 1 to 4 show the scanning electron micrographs of the ceramic materials of the present invention, corresponding to the multi-doped $BaTiO_3$ with different lead molar ratios of 0, 0.05, 0.1, and 0.2, respectively. These multi-doped $BaTiO_3$ powders with different lead molar ratios were sintered at 1350° C. for 0.5 hour in a protective atmosphere followed by reoxidation at 600° C. under a controlled oxygen pressure for 1 hour to form reduction-reoxidation capacitor materials. The specimens of the ceramic materials were ground, polished and thermally etched at 1200° C. for 20 minutes before the microstructure examination by scanning electron microscope.

The term "capacitors" used herein refers to ceramic chip capacitors, barrier layer capacitors including grain boundary barrier layer capacitors and reduction-reoxidation type semiconductive capacitors, multilayer ceramic capacitors (MLCCs), low temperature co-fired capacitors (LTCCs), and polymer/ceramic capacitors.

The term "modules" used herein refers to modules integrated with resistor and/or inductor for telecommunications, military and automotive applications, and with data processing.

The term "protective atmosphere" used herein refers to an atmosphere conventionally used in the preparation of ceramic materials without causing significantly oxidation of the materials. For example, the protective atmosphere can be a reducing atmosphere of $H_2$ or CO, an inert atmosphere of $N_2$ or Ar, a controlled oxygen pressure of the $H_2/H_2O$ or $CO/CO_2$ mixture, or the combination thereof, and can contain an oxygen pressure less than $10^{-2}$ torr.

The present invention discloses ceramic dielectrics synthesizing from raw materials of carbonates, oxides and/or hydroxides of barium (Ba), titanium (Ti), magnesium (Mg) and optionally strontium (Sr), lanthanum (La) and niobium (Nb), and lead titanate ($PbTiO_3$) and/or lead oxide (PbO), wherein the atomic percentage of lead, based on the total amount of Ba, Ti, La, Mg, Sr, Pb, and Nb is more than zero to 0.158. More specifically, the metallic components contained in the ceramic composition have the molar ratio of Ba:Sr:Pb:La:Ti:Mg as (0.475–0.98):(0–0.03):(more than 0 to 0.3):(0–0.05):(0.90–0.995):(0.005–0.1). $Nb_2O_5$, added occasionally and to retain satisfied dielectric properties, had a weight ratio of 0–0.05, based on the multi-doped $[(Ba_aSr_bPb_m)La_x](Ti_yMg_z)O_3$.

In the present invention, the composition of the ceramic powders for producing dielectrics can be expressed with the following general formula (I):

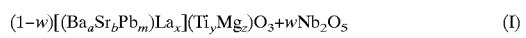

wherein a is 0.5 to 0.98, b is 0 to 0.3, m is more than zero to 0.3, preferably 0.05 to 0.2, x is 0 to 0.05, y is 0.90 to 0.995, z is 0.005 to 0.1, and w is 0 to 0.05 in weight ratio. The ceramic powders can be further subjected to densification and reduction-reoxidation procedures to provide a multi-doped $BaTiO_3$ ceramic material with a dielectric constant of about 20,000 to about 55,000 and a TCC value of about −15% to about 10%. Specifically, the multi-doped $BaTiO_3$ ceramic material provided by the present invention has a dielectric constant of about 20,000 to about 55,000, a dielectric loss tangent (tan δ) of 0.05 to 0.25, a TCC value of about −15% to about 10% at a temperature of −55° C. to 150° C., a resistivity of about $10^6$ to about $10^9$ Ω·cm, and a grain size of about 0.5 to about 3.5 μm, preferably 0.8 to 2.0 μm. The ceramic material can be used in the production of capacitors and modulus with high dielectric constants, low dielectric loss tangents, low TCC values, good resistivities, and fine grain sizes According to the present invention, the addition of a lead component such as $PbTiO_3$ and/or $PbO$ is important. The grain size of ceramic materials decreases with the increase of lead content. As "m" in formula (I) is 0.1, a well-densified ceramic material with a small grain size of about 0.8 μm to about 2.0 μm is obtained. However, since the addition of too much lead component will result in poor densification, the value of m is preferably no more than 0.2. Especially, the ceramic capacitors with the invented compositions subjected to the densification process of sintering or hot pressing followed by the reduction-reoxidation process exhibits higher dielectric constants and flat TCC values, compared to the dielectrics produced by conventional processes where the ceramic green compacts were only subjected to sintering in air. In view of the above, the addition of lead component and the specific consolidation process achieve the success of the production of the ceramic capacitors and modules and the like having high performance with low cost due to the conventional powder processing.

The capacitors comprising the ceramic materials of the present invention have the high dielectric constant values of Class III capacitors but without the drawbacks of high TCC of the Class II (high-K) and Class III (barrier layer type) dielectrics. Because of the small grain size (0.8 to 2.0 μm) by the incorporation of lead component, the ceramic materials of the present invention can substantially increase the capacitance densities of capacitors by forming into MLCCs wherein the thickness of each advanced dielectric layer is less than 5 μm.

The ceramic powders possessing with the general composition formula (I) defined hereinbefore can be processed with an aid of a glass component selected from the group consisting of a low-firing-temperature glass, lead glass or a combination thereof to provide low temperature sintered glass/$BaTiO_3$ dielectric composites, which can be used in the production of low temperature co-fired capacitors or integrated modules. The low temperature co-fired glass/$BaTiO_3$ capacitors according to the present invention have dielectric constants of about 360 to about 2,500 and a low dielectric loss tangent (tan δ) of 0.065 to 0.27.

The multi-doped $BaTiO_3$ ceramic material of the present invention can be prepared from the ceramic composition of the present invention by a process comprising conventional ceramic powder preparation steps and specific reduction-reoxidation procedures. Specifically, the raw materials of carbonates, oxides, and hydrates are first subjected to conventional ceramic powder preparation steps comprising mixing, drying, sieving, and calcining to form ceramic powders. The ceramic powders then are pressed, sintered/hot-pressed under a protective atmosphere and re-oxidized to form the multi-doped $BaTiO_3$ ceramic material. The ceramic material can be used in the production of capacitors and modules. The preferred procedures for the production of the multi-doped $BaTiO_3$ ceramic are described in detail below.

The compounds as raw materials, comprising carbonates, oxides and/or hydroxides of Ba, Ti, Mg and optionally Sr, La, and Nb, and $PbTiO_3$ and/or PbO are properly weighed and ball milled in an alcohol solution conventionally used in the art, such as ethanol, oven-dried at about 90° C. to about 110° C., sieved, and then calcined at about 900° C. to about 1150° C. for 15 minutes to about 6 hours, to obtain ceramic powders. During this process, multi-doped $BaTiO_3$ powder is formed from the raw materials.

The ceramic powders are uniaxially pressed at about 300 psi to obtain green compacts. The ceramic green compacts are sintered or hot-pressed at about 1200° C. to about 1400° C. under a protective atmosphere (e.g. inert atmosphere) for 15 minutes to about 2 hours to obtain dense compacts. Then the dense compacts are re-oxidized in a controlled oxygen pressure (e.g. air annealed) at a temperature of about 400° C. to about 1200° C. for at least 10 minutes, preferably for at least one hour, to form multi-doped $BaTiO_3$ ceramic materials for the applications in capacitors or modules. For example, the dense compacts can be re-oxidized at a temperature of about 600° C. to about 1200° C. for one hour to form Class III capacitors with re-oxidized outer layers surrounding semiconductive grains.

The low temperature sintered glass/$BaTiO_3$ dielectric composites of the present invention can be obtained by sintering the ceramic powders prepared from the ceramic composition of the present invention with the addition of a glass component selected from the group consisting of a low-firing-temperature glass, lead glass or a combination thereof via reduction-reoxidation procedures. Specifically, to obtain the low temperature sintered glass/$BaTiO_3$ dielectric composites, the ceramic powders prepared from the ceramic composition of the present invention and obtained as above are mixed with the glass component by use of an agate mortar and pestle. Preferably, the glass component has a melting point of from about 600° C. to about 900° C. The glass component lowers the sintering temperature and is advantageous for low temperature processing. However, since the addition of too much such glass component will result in poor dielectric behaviors of dielectric products, the glass component preferably constitutes from 10% to 35% by weight of the composites. The glass/ceramic mixture is uniaxially pressed at about 300 psi to form glass/$BaTiO_3$ green compacts. The glass/$BaTiO_3$ green compacts are sintered at a temperature of about 850° C. to about 1100° C. under a protective atmosphere for 15 minutes to about 4 hours to obtain dense glass/$BaTiO_3$ compacts. The dense glass/$BaTiO_3$ compacts can be re-oxidized in a controlled oxygen pressure (e.g. air annealed) at a temperature of about 400° C. to about 1200° C. for at least 10 minutes, preferably for at least one hour to form the low temperature sintered glass/$BaTiO_3$ dielectric composites. For example, the dense glass/$BaTiO_3$ compacts can be re-oxidized in air at about 600° C. or 800° C. for one hour to make $BaTiO_3$ component with re-oxidized outer insulating layers surrounding semi-conductive grains.

The multi-doped $BaTiO_3$ ceramic materials and glass/$BaTiO_3$ dielectric composites of the present invention can be polished to give flat surfaces, covered with silver paste for electrodes, and fired to dry for the applications in capacitors and modules. The dielectric constant and dielectric loss of the ceramic materials and dielectric composites are measured at temperatures of from −55° C. to 150° C. by employing HP 4284A LCR meter (Agilent Technologies, USA) at $V_{rms}$=1 volt and at frequency of 100 kHz. The TCC value is determined over the temperatures of about −55° C. to about 150° C. on the basis of the capacitance at 25° C. Resistivity was obtained by using an electrometer/high-resistance meter (Model 6517A, Keithley Instruments, Inc. USA). Moreover, the ceramic materials of the present invention can be ground, polished and thermally etched at about 1200° C. for about 15 to about 30 minutes to observe the degree of densification and determine the grain size by scanning electron microscope.

A more complete understanding of the ceramic materials of the present invention and its applications may be obtained by reference to the following preferred embodiments.

EXAMPLES

To conduct the examples, the commercially available industry grade raw materials were calculated, weighted and mixed in ratios to produce the ceramic capacitors of $[(Ba_aSr_bPb_m)La_x](Ti_yMg_z)O_3$, wherein the six metallic components were in the following molar ratios as listed in Table 1.

TABLE 1

| Composition | molar ratio | | | | | |
|---|---|---|---|---|---|---|
| | a | b | m | x | y | z |
| A(comparative) | 0.8 | 0.2 | 0 | 0.02 | 0.99 | 0.01 |
| B | 0.75 | 0.2 | 0.05 | 0.02 | 0.99 | 0.01 |
| C | 0.7 | 0.2 | 0.1 | 0.02 | 0.99 | 0.01 |
| D | 0.6 | 0.2 | 0.2 | 0.02 | 0.99 | 0.01 |

General Procedures

The ceramic starting raw materials, comprising carbonates, oxides and/or hydroxides of barium (Ba), titanium (Ti), magnesium (Mg) and optionally strontium (Sr) and lanthanum (La), and lead titanate ($PbTiO_3$) and/or lead oxide (PbO), were weighted based on the element amounts as listed in Table 1, mixed and ball-milled in ethanol, oven-dried at 100° C., sieved, and calcined at 1000° C. for 2 hours, to form ceramic powders. After ball milling, drying, and sieving the ceramic powders were pressed and then subjected to a densification process or the densification and reduction-reoxidation procedures under the conditions as described in the following working examples.

Examples 1A to 1D (Comparative)

The ceramic powders having composition A, B, C or D as defined in Table 1 were sintered in air at 1350° C. for one hour.

Table 2 shows the dielectric constants (K), dielectric loss tangents (tan δ), and TCC values at 85° C., 125° C. and 150° C. of Examples 1A to 1D.

TABLE 2

| Example (Comparative) | K 25° C. | tan δ 25° C. | TCC at 85° C. (%) | TCC at 125° C. (%) | TCC at 150° C. (%) |
|---|---|---|---|---|---|
| 1A | 8,965 | 0.017 | −75 | −83 | −86 |
| 1B | 6,056 | 0.074 | −36 | −60 | −67 |
| 1C | 2,845 | 0.042 | +17 | −47 | −47 |
| 1D | 1,360 | 0.029 | +81 | +54 | +54 |

Examples 2B and 2C (Comparative)

The ceramic powders having composition B or C as defined in Table 1 were sintered under argon at 1350° C. for one hour.

Table 3 shows the dielectric constants (K), dielectric loss tangents (tan δ) and TCC values at −55° C., 85° C., 125° C. and 150° C. of the ceramic materials of Examples 2B and 2C.

TABLE 3

| Example | K 25° C. | tan δ 25° C. | TCC (%) −55° C. | TCC (%) 85° C. | TCC (%) 125° C. | TCC (%) 150° C. |
|---|---|---|---|---|---|---|
| 2B | 20,076 | 0.180 | −5.3 | +5.1 | +8.3 | +1.2 |
| 2C | 11,740 | 0.190 | −7.5 | +9.7 | +8.3 | +15.9 |

Examples 3B and 3C

The ceramic powders having composition B or C as defined in Table 1 were sintered under argon at 1350° C. for one hour, and then re-oxidized at 800° C. for one hour.

Examples 4B and 4C

The ceramic powders having composition B or C as defined in Table 1 were sintered under argon at 1350° C. for one hour, and then re-oxidized at 1000° C. for one hour.

Tables 4 and 5 show the dielectric constants (K), dielectric loss tangents (tan δ), TCC values at −55° C., 85° C., 125° C. and 150° C., and resistivities (ρ) at 25° C. of the ceramic materials of Examples 3B and 3C, and 4B and 4C, respectively.

TABLE 4

| Example | K 25° C. | tan δ 25° C. | TCC (%) −55° C. | TCC (%) 85° C. | TCC (%) 125° C. | TCC (%) 150° C. | ρ (Ω · cm) 25° C. |
|---|---|---|---|---|---|---|---|
| 3B | 46,610 | 0.066 | −5.8 | −2.3 | −2.3 | −2.6 | $6.07 \times 10^6$ |
| 3C | 26,990 | 0.168 | −11.6 | +3.0 | +3.2 | +2.8 | $56.8 \times 10^6$ |

TABLE 5

| Example | K 25° C. | tan δ 25° C. | TCC (%) −55° C. | TCC (%) 85° C. | TCC (%) 125° C. | TCC (%) 150° C. | ρ (Ω · cm) 25° C. |
|---|---|---|---|---|---|---|---|
| 4B | 54,510 | 0.061 | −5.7 | −2.0 | −2.7 | −0.3 | $6.1 \times 10^6$ |
| 4C | 34,080 | 0.141 | −7.5 | −2.8 | −3.9 | −5.0 | $0.61 \times 10^9$ |

Example 5B

The ceramic powders having composition B as defined in Table 1 were sintered under argon at 1350° C. for one hour, and then re-oxidized at 1050° C. for one hour.

Example 6B

The ceramic powders having composition B as defined in Table 1 were sintered under argon at 1350° C. for one hour, and then re-oxidized at 1100° C. for one hour.

Table 6 shows the dielectric constants (K), dielectric loss tangents (tan δ), TCC values at 85° C., 125° C. and 150° C., and resistivities (ρ) at 25° C. of the ceramic materials of Examples 5B and 6B.

TABLE 6

| Example | K 25° C. | tan δ 25° C. | TC (%) 85° C. | TC (%) 125° C. | TC (%) 150° C. | ρ (Ω · cm) 25° C. |
|---|---|---|---|---|---|---|
| 5B | 49,343 | 0.05 | −1.8 | −5.5 | −8.8 | 0.16 × 10$^9$ |
| 6B | 55,354 | 0.066 | −3.8 | −11.0 | −14.3 | 2.61 × 10$^9$ |

Example 7B (Comparative)

The ceramic powders having composition B as defined in Table I were hot-pressed under argon at 1250° C. for one hour.

Examples 8B and 8C

The ceramic powders having composition B or C as defined in Table I were hot-pressed under argon at 1250° C. for one hour, and then re-oxidized at 800° C. for one hour.

Examples 9B and 9C

The ceramic powders having composition B or C as defined in Table I were hot-pressed under argon at 1250° C. for one hour, and then re-oxidized at 1000° C. for one hour.

Table 7 shows the dielectric constants (K), dielectric loss tangents (tan δ) TCC values at 85° C., 125° C. and 150° C., and resistivities (ρ) at 25° C. of the ceramic materials of Examples 7B, 8B, 8C, 9B and 9C.

TABLE 7

| Example | K 25° C. | tan δ 25° C. | TCC at 85° C. (%) | TCC at 125° C. (%) | TCC at 150° C. (%) | ρ (Ω · cm) 25° C. |
|---|---|---|---|---|---|---|
| 7B | 17,275 | 0.208 | +5.1 | +8.3 | +1.2 | 6.07 × 10$^6$ |
| 8B | 54,925 | 0.064 | −2.3 | −2.3 | −2.6 | 4.8 × 10$^6$ |
| 8C | 49,958 | 0.088 | −3.3 | −3.8 | −4.4 | 1.11 × 10$^9$ |
| 9B | 47,662 | 0.129 | −2.0 | −2.7 | −0.3 | 8.9 × 10$^6$ |
| 9C | 20,212 | 0.136 | −6.3 | −10.0 | −12.2 | 0.33 × 10$^9$ |

Example 10B

The ceramic mixed powders of composition B as defined in Table 1 and 1.7 wt. % Nb$_2$O$_5$ were sintered under argon at 1350° C. for one and half an hours, and then re-oxidized at 1000° C. for one hour.

Table 8 shows a dielectric constant (K), a dielectric loss tangent (tan δ), TCC values at 85° C., 125° C. and 150° C., and a resistivity (ρ) at 25° C. of the ceramic material of Example 10B.

TABLE 8

| Example | K 25° C. | tan δ 25° C. | TC (%) 85° C. | TC (%) 125° C. | TC (%) 150° C. | ρ (Ω · cm) 25° C. |
|---|---|---|---|---|---|---|
| 10B | 24,860 | 0.046 | +0.9 | +2.2 | +1.8 | 1.0 × 10$^6$ |

Examples 11A and 11C (Comparative)

The glass/BaTiO$_3$ mixture comprising 30 wt % of lead glass and the ceramic powders of composition A or C as defined in Table 1 was sintered in air at 1050° C. for one hour to form a glass/BaTiO$_3$ composite capacitor.

Table 9 shows the dielectric constants (K), dielectric loss tangents (tan δ), and TCC value for the glass/BaTiO$_3$ composites of Examples 11A and 11C.

TABLE 9

| Example | K 25° C. | tan δ 25° C. | TCC (%) 85° C. |
|---|---|---|---|
| 11A | 240 | 0.019 | −11.7 |
| 11C | 240 | 0.019 | −2.4 |

Example 12C

The glass/BaTiO$_3$ mixture comprising 30 wt % of lead glass and the ceramic powders of composition C as defined in Table 1 was sintered in argon at 1050° C. for one hour to form a glass/BaTiO$_3$ capacitor.

Example 13C

The glass/BaTiO$_3$ mixture comprising 30 wt % of lead glass and the ceramic powders of composition C as defined in Table 1 was sintered in argon at 1050° C. for one hour, and then re-oxidized at 600° C. for one hour to form a glass/BaTiO$_3$ capacitor.

Example 14C

The glass/BaTiO$_3$ mixture comprising 30 wt % of lead glass and the ceramic powders of composition C as defined in Table 1 was sintered in argon at 1050° C. for one hour, and then re-oxidized at 800° C. for one hour to form a glass/BaTiO$_3$ composite.

Table 10 shows the dielectric constants (K), dielectric loss tangents (tan δ), and TCC values for the glass/BaTiO$_3$ composite capacitors of Examples 12C, 13C and 14C.

TABLE 10

| Example | K 25° C. | tan δ 25° C. | TCC (%) 85° C. |
|---|---|---|---|
| 12C | 1,047 | 0.21 | +14.5 |

TABLE 10-continued

| Example | K 25° C. | tan δ 25° C. | TCC (%) 85° C. |
|---|---|---|---|
| 13C | 2,560 | 0.27 | +19.8 |
| 14C | 364 | 0.065 | +6.8 |

Examples 15A to 15D

Figure 2:
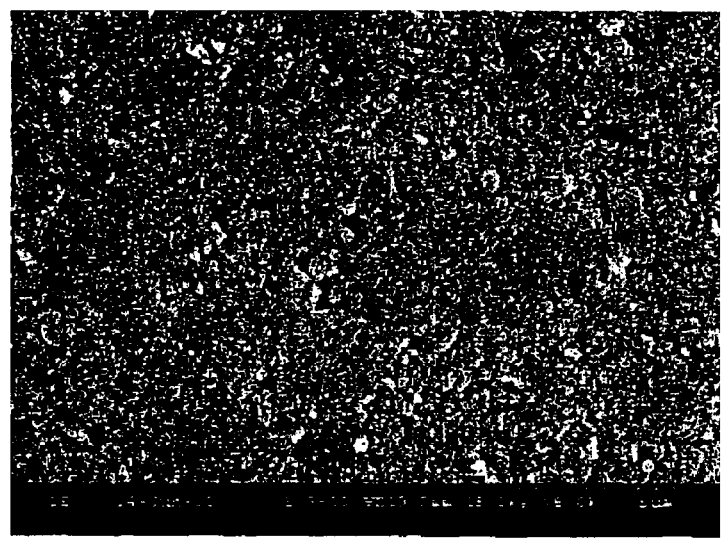
Figure 3:
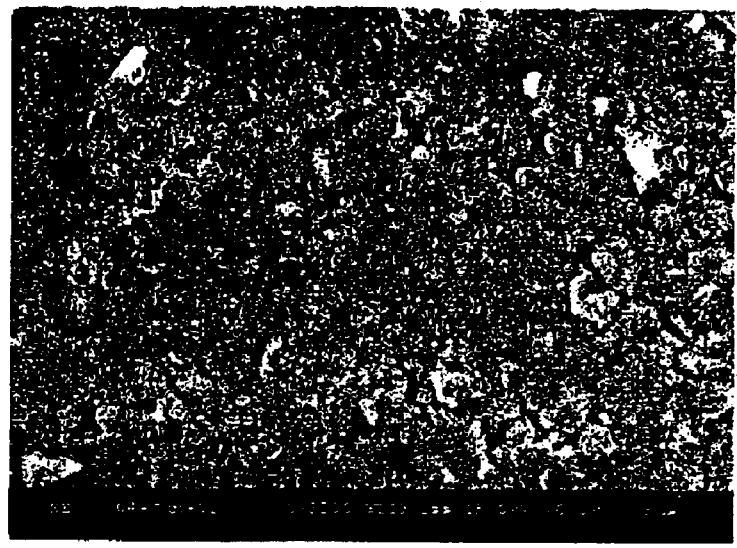
Figure 4:
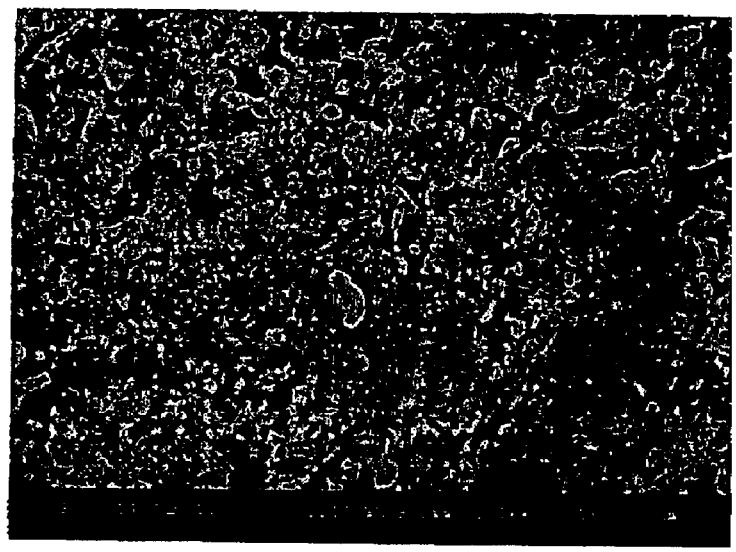

Examples 15A to 15D were the results of microstructural analyses to demonstrate the effect of the incorporation of lead to the microstructure and the grain size of the ceramic materials of the present invention. The ceramic powders having composition A, B, C or D as defined in Table 1 were sintered at 1350° C. for 0.5 hour in a protective atmosphere followed by reoxidation at 600° C. for 1 hour to form reduction-reoxidation type capacitors. The specimens of the ceramic materials were ground, polished and thermally etched at 1200° C. for 20 minutes before the microstructure examination by scanning electron microscope. The scanning electron micrographs of the ceramic dielectrics of Examples 15A to 15D are shown in FIGS. 1 to 4, respectively. The results are listed in Table 11:

TABLE 11

| Example | grain size (μm) | Degree of densification |
|---|---|---|
| 15A (comparative) | 5–10 | dense |
| 15B | 0.8–3.5 | dense |
| 15C | 0.8–2 | dense |
| 15D | 0.5–3 | not dense |

The data show that the ceramic materials of the present invention possess a high dielectric constant of about 20,000 to about 55,000, a dielectric loss tangent (tan δ) of about 0.05 to about 0.25, a low capacitance change with temperature (TCC) of about −15% to about 10% at a temperature of −55° C. to 150° C., a resistivity of about $10^6$ Ω·cm to about $10^9$ Ω·cm, and a grain size of from about 0.5 to about 3.5 μm. The present invention provides the compositions for capacitors and modules possessing improved dielectric properties after the densification and reduction-reoxidation procedures. Moreover, the lead-containing ceramic capacitors with compositions B, C and D, prepared by the process of the present invention comprising specific reduction-reoxidation procedures, have a fine grain size of about 0.5 to about 3.5 μm, which is advantageous for the production of MLCCs than those capacitors prepared by the conventional ceramic route with a grain size larger than 5 μm. The grain size of the ceramic material of composition A without lead is 5 to 10 μm.

Although the preferred embodiments of the present invention have been illustrated in the above Examples and Tables and described in the foregoing detailed descriptions, it will be understood that the invention is not limited to the embodiments disclosed, but is capable of numerous rearrangements, modifications and substitutions without departing from the spirit of the invention as set forth and defined by the following claims.

What is claimed is:

1. A ceramic material having a dielectric constant of about 20,000 to about 55,000, a dielectric loss tangent (tan δ) of about 0.05 to about 0.25, a low capacitance change with temperature (TCC) of about −15% to about 10% at a temperature of −55° C. to 150° C., a resistivity of about $10^6$ Ωcm to about 109 Ωcm, and a grain size of about 0.5 to about 3.5 μm of the following general formula (I):

$$(1-w)[(Ba_aSr_bPb_m)La_x](Ti_yMg_z)O_3+w\ Nb_2O_5 \qquad (I)$$

wherein a is 0.5 to 0.98, b is 0 to 0.3, m is more than 0 to 0.3, x is 0 to 0.05, y is 0.90 to 0.995, z is 0.005 to 0.1, and w is 0 to 0.05 in weight ratio.

2. The ceramic material of claim 1, wherein m is 0.05 to 0.2.

3. A ceramic powder, which has its composition with the following general formula (I):

$$(1-w)[(Ba_aSr_bPb_m)La_x](Ti_yMg_z)O_3+w\ Nb_2O_5 \qquad (I)$$

wherein a is 0.5 to 0.98, b is 0 to 0.3, m is more than 0 to 0.3, a+b+m=1.0, x is 0 to 0.05, y is 0.90 to 0.995, z is 0.005 to 0.1, and w is 0 to 0.05 in weight ratio.

4. The ceramic powder of claim 3, wherein m is 0.05 to 0.2.

5. The ceramic powder of claim 3 for use in the production of capacitors and modules.

6. The ceramic powder of claim 3 for use in the production of a capacitor having a dielectric constant of about 20,000 to about 55,000, a dielectric loss tangent (tan δ) of about 0.05 to about 0.25, a low TCC of about −15% to about 10% at a temperature of −55° C. to 150° C., a resistivity of about $10^6$ Ωcm to about $10^9$ Ωcm, and a grain size of about 0.5 to about 3.5 μm.

7. The ceramic powder of claim 6, wherein the capacitor has a grain size of about 0.8 to about 2.0 μm and a low capacitance change with temperature (TCC) of about −10% to about 0% at a temperature of −55° C. to 150° C.

8. The ceramic powder of claim 3, which further comprises a glass component selected from the group consisting of a low-firing-temperature glass, lead glass or a combination thereof.

9. The ceramic powder of claim 8, wherein the glass component is present from 10% to 35% by weight, based on the total amount of the ceramic powder and the glass component.

10. The ceramic powder of claim 8 for use in the production of low temperature co-fired capacitors.

11. The ceramic powder of claim 10, wherein the low temperature co-fired capacitors have dielectric constants of about 360 to about 2,500.

12. The ceramic powder of claim 11, wherein the low temperature co-fired capacitors have a dielectric loss tangent (tan d) of about 0.065 to about 0.27.

13. The ceramic powder of claim 3, which is prepared from raw materials of carbonates, oxides and/or hydroxides of barium (Ba), titanium (Ti), magnesium (Mg) and optionally strontium (Sr), lanthanum (La) and niobium (Nb), and lead titanate (PbTiO3) and/or lead oxide (PbO), wherein the atomic percentage of lead, based on the total amount of Ba, Ti, Mg, Pb, and optionally Sr, La and Nb, is more than 0 to 0.158.

14. The ceramic powder of claim 13, wherein the atomic ratio of Ba:Sr:Pb:La:Ti:Mg is (0.5–0.98): (0–0.03) (more than 0 to 0.3): (0–0.05): (0.90–0.995): (0.005–0.1).

15. The ceramic power of claim 13, wherein the weight ratio of $[(Ba_aSr_bPb_m)La_x](Ti_yMg_z)O_3:Nb_2O_5$ is (0.95–1): (0–0.05).

16. The ceramic powder of claim 13 for use in the production of capacitors and modulus.

17. The ceramic powder of claim 13 for use in the production of a capacitor having a dielectric constant of about 20,000 to about 55,000, a low dielectric loss tangent (tan δ) of about 0.05 to about 0.25, a low TCC of about −15% to about 10% at a temperature range of −55° C. to 150° C., a resistivity of about $10^6$ Ωcm to about $10^9$ Ωcm, and a fine grain size of about 0.5 to about 3.5 μm.

18. The ceramic powder of claim 17, wherein the capacitors have a grain size of about 0.8 to about 2.0 μm and a TCC value of about −10% to about 0%.

* * * * *